United States Patent [19]

Engel et al.

[11] 4,113,636
[45] Sep. 12, 1978

[54] AMINATED POLYMERIC ADDITIVES FOR FUELS AND LUBRICANTS

[75] Inventors: Lawrence J. Engel, Green Brook; John B. Gardiner, Mountainside, both of N.J.

[73] Assignee: Exxon Research & Engineering Co., Linden, N.J.

[21] Appl. No.: 493,328

[22] Filed: Jul. 31, 1974

[51] Int. Cl.² .............................................. C10M 1/32
[52] U.S. Cl. ........................... 252/51.5 R; 252/51.5 A
[58] Field of Search ...................... 252/51.5 R, 51.5 A

[56] References Cited

U.S. PATENT DOCUMENTS

| | | | |
|---|---|---|---|
| 3,544,520 | 12/1970 | Culbertson et al. | 252/51.5 R X |
| 3,687,849 | 8/1972 | Abbott | 252/51.5 A X |
| 3,769,216 | 10/1973 | Gordon et al. | 252/51.5 R |
| 3,785,980 | 1/1974 | Wilgus | 252/51.5 R X |
| 3,842,010 | 10/1974 | Pappas et al. | 252/51.5 R |
| 3,864,268 | 2/1975 | Culbertson et al. | 252/51.5 R X |

FOREIGN PATENT DOCUMENTS 2,207,434  9/1972  Fed. Rep. of Germany ..... 252/51.5 R

*Primary Examiner*—Delbert E. Gantz
*Assistant Examiner*—Andrew H. Metz
*Attorney, Agent, or Firm*—Frank T. Johmann

[57] ABSTRACT

Copolymers, having a degree of crystallinity of 3 up to 25 weight percent, comprising about 68 to 80 mole % ethylene, and one or more $C_3$ to $C_8$ alpha-olefins are mechanically degraded at elevated temperatures, in the presence of air or oxygen-containing gas, to form an oxygenated-degraded polymer, which is reacted with an amine compound. Preferably, the polymer is only partially reacted with the amine. The resulting aminated polymers are useful as sludge dispersants for fuels and lubricants. When the aminated polymers have a high molecular weight, they are also useful as viscosity-index improvers.

5 Claims, No Drawings

AMINATED POLYMERIC ADDITIVES FOR FUELS AND LUBRICANTS

BACKGROUND OF THE INVENTION

1. Field of the Invention

This invention relates to polymeric dispersant additives for lubricants and hydrocarbon fuels. When of high molecular weight, the additives are also useful as viscosity-index improvers for lubricants. More particularly, this invention relates to copolymers, having a degree of crystallinity of 3 to 25 weight percent, as determined by X-ray or differential thermal analyses, comprising from about 68 to 80 mole percent of ethylene and one or more $C_3$ to $C_8$ alpha-olefins, usually propylene, which have been mechanically degraded as by intensive milling at elevated temperature, usually in the absence of a solvent or fluxing medium, and in the presence of air or oxygen-containing gas to form an oxygenated degraded polymer which is reacted with an amine compound to form an aminated oxy-degraded polymeric reaction product.

2. Description of the Prior Art

A variety of polymeric materials which incorporate nitrogen have been described in U.S. and foreign patents as dispersants for fuels and lubricants, and as viscosity index improvers for lubricants. For example:

U.S. Pat. No. 3,404,091 grafts polar monomers, such as acrylonitrile onto hydroperoxidized copolymers of ethylene and propylene.

U.S. Pat. No. 3,404,092 reacts hydroxylated ethylene-propylene copolymers with isocyanates.

U.S. Pat. No. 3,687,849 grafts various unsaturated monomers onto a degraded, hydroperoxidized, interpolymer of ethylene and propylene.

U.S. Pat. No. 3,769,216 shows an atactic (i.e., non-crystalline) copolymer of ethylene and propylene containing from 45 to 65 mole percent of ethylene, mechanically degraded in the presence of oxygen, followed by reaction with a polyamine.

U.S. Pat. No. 3,785,980 discloses the reaction product of an amine with a hydroperoxidized atactic copolymer of ethylene and propylene containing from 45 to 65 mole percent of ethylene.

British Pat. No. 1,172,818 describes the preparation of lube oil additives by the condensation of an amine with an oxidized, e.g., ozonized, polymer.

SUMMARY OF THE INVENTION

Of the above-noted prior art, U.S. Pat. No. 3,769,216 appears to be the most pertinent. In contrast to said patent, which is directed to amorphous copolymers containing 45–65 mole % ethylene, we have found that we can make satisfactory products using a higher ethylene content copolymer, even though the copolymer has some crystallinity. These high ethylene content, slightly crystalline polymers are desirable as they generally give a greater VI (viscosity index) effect than similar copolymers with a lower ethylene content. However, these high ethylene content copolymers, due to their crystallinity, tend to be less soluble in mineral lubricating oil, and are therefore more susceptible to haze formation. Thus, in oxidizing these high ethylene content polymers by mastication in the presence of air, followed by reaction with a stoichiometric or excess amount of amine, e.g., tetraethylene pentamine, hazy solutions usually developed when the resulting aminated polymer was added to oil. Subsequently, it was found that by only partially aminating the oxidized polymer, that the haze did not occur indicating that unreacted polyamine may have been at least partially responsible for the haze. As a further development, a control test was devised to determine the amount of polyamine that could be reacted with the oxidized polymer without forming haze. In the case of the higher polyamines, such as tetraethylene pentamine and its higher homologues, which cannot be readily distilled from the aminated oxidized polymer, the avoidance of haze becomes of particular concern.

The high ethylene content copolymers of ethylene and one or more $C_{3-8}$ monoolefin, usually propylene, of the invention are generally characterized by:

(a) an ethylene content of about 68 to 80 mole percent, e.g., 70 to 80 mole %;

(b) a degree of crystallinity of 3 up to 25%, e.g., 4 to 12 wt. %, as determined by X-ray and differential scanning calorimetry. Procedures for determining crystallinity by these methods may be found in J. Polymer Sci. A-2, 9, 127 (1971) by G. VerStrate and Z.W. Wilchinsky;

(c) a weight average molecular weight ($\overline{M}_w$) in the range of 2,000 to 800,000; preferably 2,500 to 500,000; most preferably 30,000 to 400,000;

(d) a number average molecular weight ($\overline{M}_n$) in the range of 700 to 250,000; preferably 800 to 100,000; most preferably 10,000 to 100,000;

(e) a narrow range of molecular weights as measured by the ratio of $\overline{M}_w/\overline{M}_n$ of 8 or less, preferably 6 or less.

DESCRIPTION OF PREFERRED EMBODIMENTS

I. Preparation of Copolymer

Copolymers comprising from about 68 to 80 mole percent of ethylene and one or more $C_3$ to $C_8$ alpha-olefins, preferably propylene, having the degree of crystallinity, and range of molecular weights suitable for the practice of this invention may be readily prepared using soluble Ziegler-Natta catalyst compositions, which are well known in the art. For recent reviews of the literature and patent are see: "Polyolefin Elastomers Based On Ethylene and Propylene," by F.P. Baldwin and G. VerStrate in Rubber Chem. & Tech. Vol. 45, No. 3, 709-881, (1972) and "Polymer Chemistry Of Synthetic Elastomers," edited by Kennedy and Tornqvist, Interscience, N.Y. 1969.

Suitable copolymers may be prepared in either batch or continuous reactor systems. In common with all Ziegler-Natta polymerizations, monomers, solvents and catalyst components are dried and freed from moisture, oxygen or other constituents which are known to be harmful to the activity of the catalyst system. The feed tanks, lines and reactors may be protected by blanketing with an inert dry gas such as purified nitrogen. Chain propagation retarders or stoppers, such as hydrogen and anhydrous hydrogen chloride, may be fed continuously or intermittently to the reactor for the purpose of controlling the molecular weight within the desired limits and the degree of crystallinity known to be optimum for the end product.

In addition to ethylene and propylene which are available commercially in a state of purity designated "polymerization grade," other olefins which are useful for the preparation of these copolymers include: 1-butene, 1-pentene, 1-hexene and 1-octene. Branched chain alpha-olefins, such as 5-methylpentene-1 and 6-methylheptene-1, may also be utilized.

Media for dissolving or dispersing the catalyst components and copolymer reaction products, and for heat exchange, may be selected from the general group of saturated petroleum hydrocarbons and halogenated hydrocarbons. $C_{12}$ or lower, straight or branched chain hydrocarbons are preferred. However, $C_5$ to $C_9$ saturated alicyclic, or $C_6$ to $C_9$ aromatic hydrocarbons may be used with equal facility. Equally useful are halogenated hydrocarbons having two to six carbon atoms in the molecule. Representative non-limiting examples of solvents, which are also useful for removal of the heat of reaction, include: propane, butane, pentane, hexane, cyclopentane, heptane, cyclohexane, methyl cyclopentane, n-heptane, methyl cyclohexane, isooctane, benzene, toluene, mixed xylenes, sym-dichloroethane, trichloroethane and ortho-dichlorobenzene.

Principal Ziegler-Natta catalysts, useful in the synthesis of suitable copolymers of this invention, are selected from the group of transition metal compounds comprising Groups IVb, Vb and VIb of the Periodic Table of the Elements. Particularly useful are compounds of vanadium and titanium. Most preferred are compounds of vanadium having the general formula $VO_zX_t$, wherein z has a value of 0 or 1, t has a value of 2 to 4 and X is independently selected from the group consisting of halogens having an atomic number equal to or greater than 17 (Cl, Br and I), acetylacetonates, haloacetylacetonates, alkoxides and haloalkoxides. Nonlimiting examples of such catalysts are: $VOCl_3$; $VO(AcAc)_2$; $VOCl_2(OBu)$; $V(AcAc)_3$ and $VOCl_2AcAc$; where Bu is butyl and AcAc is an acetylacetonate.

Titanium compounds, which are best used in combination with vanadium compounds, have the general formula $Ti(OR)_4$, wherein R is an acyclic, or alicyclic, monovalent hydrocarbon radical of 1 to 12 carbon atoms.

Most preferred among the principal catalysts are: vanadyl trichloride ($VOCl_3$), and tetrabutyl titanate ($Ti(OBu)_4$) used in combination with $VOCl_3$.

Ziegler-Natta cocatalysts, for use with the above principal catalysts, comprise organometallic reducing compounds from Groups IIa, IIb and IIIa of the Periodic Table of the Elements. Particularly useful are the organoaluminum compounds having the general formula A $1R'_mX'_n$, wherein R' is a monovalent hydrocarbon radical selected from the group consisting of $C_1$ to $C_{12}$ alkyl; $C_6$ to $C_{12}$ alkylaryl and arylalkyl; and $C_5$ to $C_{12}$ cycloalkyl radicals, wherein m is a number from 1 to 3, X' is a halogen having an atomic number equal to or greater than 17, and the sum of m and n is equal to three.

Non-limiting examples of useful cocatalysts are: Al(Et)$_3$; Al(isoBu)$_3$; EtAl(Cl)$_2$; Et$_2$AlCl; and Et$_3$Al$_2$Cl$_3$.

The temperature at which the polymerization is conducted can influence the stability of the catalyst species present in the reaction, with a corresponding influence on the rate of polymerization and the molecular weight of the polymer which is formed. Suitable temperatures are in the range of $-40°$ to $100°$ C., preferably $10°$ to $80°$ C., most preferably about $20°$ to $60°$ C.

The pressure at which the polymerization is conducted will depend on the solvent, the temperature which is maintained in the reaction milieu and the rate that monomers are fed to the reactor. In the preferred temperature range, a pressure in the range of about 0 to 150 psig has given satisfactory results.

Molecular weight may be regulated by choice of solvent, monomer, principal catalyst concentration, temperature, the nature and amount of the cocatalyst, e.g., aluminum alkyl cocatalyst concentration, and whether a chain transfer reagent such as hydrogen is employed.

Polymerization may be effected to produce the high ethylene content copolymers used in the invention. By passing 0.1 to 15, for example 5 parts of ethylene; 0.05 to 10, for example 2.5 parts of higher alpha-olefin, typically propylene; and from 10 to 10,000 parts of hydrogen per million parts of ethylene; into 100 parts of an inert liquid solvent containing (a) from about 0.0017 to 0.017, for example 0.0086 parts of a transition metal principal catalyst, for example $VOCl_3$; and (b) from about 0.0084 to 0.084, for example 0.042 parts of cocatalyst, such as $(C_2H_5)_3 Al_2Cl_3$; at a temperature of about 25° C. and a pressure of 60 psig. for a period of time sufficient to effect optimum conversion, for example, 15 minutes to one-half hour.

Since the reactivity of the higher alpha-olefin and rate in which it is incorporated into the copolymer is less than it is for ethylene, it is desirable to feed somewhat more than the theoretical proportions of higher alpha-olefin to obtain a copolymer having the desired ethylene content.

Conventional procedures, well known in the art may be used for recovery of the polymer from the reaction mixture leaving the reactor. The polymer "cement" issuing from the reactor may be quenched with a lower alcohol such as methanol or isopropanol. A chelating agent can be added to solubilize the catalyst residues, and the polymer recovered as an aqueous slurry by steam stripping. The resulting wet crumb may be purified by filtration, and then dried at a moderately elevated temperature under vacuum.

While the copolymers which are suitable for the practice of this invention may appear to be amorphous by superficial inspection, analysis of these polymers by the methods detailed in the article by VerStrate and Wilchinsky, referred to above, shows crystallinity in these copolymers of ethylene, especially with propylene, having about 68 mole percent or more of ethylene. Increasing the concentration of ethylene increases the degree of crystallinity.

II. Oxidative Degradation of Polymer

The reduction in molecular weight of polymers by mechanical means is old in the art. For the purposes of this invention the mechanical breakdown and oxidation of the copolymer may be done with a single piece of equipment, or may be done in stages with increasing intensity of the degree of breakdown which takes place and the amount of oxygen incorporated in the polymer. It is preferred to operate in the absence of solvent or fluxing oil so the polymer is readily exposed to air. Useful equipment includes Banbury mixers and mills having adjustable gaps, which devices may be enclosed in jacketed containers through which a heating medium may be passed such as superatmospheric steam, or heated DOWTHERM ®. When mastication or breakdown has reached a desired level, as determined by oxygen uptake and reduction in thickening efficiency (T.E.) as defined below, a fluxing oil may be added to the degraded polymer. Usually enough oil is added to provide a concentration of degraded polymer in the range of about 5 weight percent to 50 weight percent based on the weight of the total resulting solution. The resulting oil solution may thereafter be reacted with the amine compound to yield a solution of the aminated oxy-degraded copolymer.

Useful temperatures for oxidatively degrading the polymers are in the range of about 250° to 750° F. The time required to achieve satisfactory results will depend on the type of degrading or mastication equipment, the temperature of degrading, and particularly the speed of rotation if using a blade mixer as the degrading or masticating device. In this regard, we have found the Bramley Beken Blade Mixer to be particularly useful in providing in a single piece of equipment, the desired degree of mastication, or milling and oxidative degradation. This mixer, which is equipped with a variable speed drive, has two rollers, fitted with helically disposed knives geared so that one roller revolves at one-half the speed of the other. The rollers are journalled in a jacketed reactor having two hemispherical halves in its base, which conform to the radii of the two rollers. Superheated steam, or heated DOWTHERM ®, may be circulated through the jacket to provide the desired temperature. With this mixer satisfactory reductions in thickening efficiency may be obtained in from 2 to 12 hours in the temperature range of 300° to 450° F.

Thickening efficiency (T.E.) is defined as the ratio of the weight percent of a polyisobutylene (sold by Exxon Chemical Co., New York, N.Y. as PARATONE N ®) having a Staudinger Molecular Weight of 20,000, required to thicken a solvent extracted neutral oil, having a viscosity of 150-155 SUS at 100° F., a viscosity index of 105 and an A.S.T.M. pour point of 0° F., (Solvent 150 Neutral) to a viscosity of 12.4 centistokes at 210° F., to the weight of a test copolymer required to thicken the same oil to the same viscosity at the same temperature.

III. Amine Compound

Useful amine compounds for condensation with the oxy-degraded copolymers include mono and polyamines of about 2 to 60, e.g., 3 to 20, total carbon atoms and about 1 to 12, e.g., 2 to 6 nitrogen atoms in the molecule, which amines may be hydrocarbyl amines or may be hydrocarbyl amines including other groups, e.g., hydroxy groups, alkoxy groups, amide groups, imidazoline groups, and the like. Preferred amines are aliphatic saturated amines, including those of the general formulae:

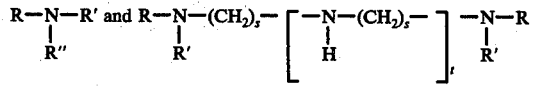

wherein R, R' and R" are independently selected from the group consisting of hydrogen; $C_1$ to $C_{12}$ straight or branched chain alkyl radicals; $C_1$ to $C_{12}$ alkoxy $C_2$ to $C_6$ alkylene radicals; $C_2$ to $C_{12}$ hydroxy or amino alkylene radicals; and $C_1$ to $C_{12}$ alkylamino $C_2$ to $C_6$ alkylene radicals; s is a number of from 2 to 6, preferably 2 to 4; and t is a number of from 0 to 10, preferably 2 to 6.

Non-limiting examples of suitable amine compounds include: 1,2-diaminoethane; 1,3-diaminopropane; 1,4-diaminobutane; 1,6-diaminohexane; diethylene triamine; triethylene tetramine; tetraethylene pentamine; 1,2-propylene diamine; di-(1,2-propylene) triamine; di-(1,3-propylene) triamine; N,N-dimethyl-1,3-diaminopropane; N,N-dl-(2-aminoethyl) ethylene diamine; N,N-di-(2-hydroxyethyl)-1,3-propylene diamine; 3-dodecyloxypropylamine; N-dodecyl-1,3-propane diamine; tris hydroxymethyl methylamine, diisopropanol amine, and diethanol amine.

Other useful amine compounds include: alicyclic diamines such as 1,4-di-(aminomethyl) cyclohexane, and heterocyclic nitrogen compounds such as imidazolines and N-aminoalkyl piperazines of the general formula:

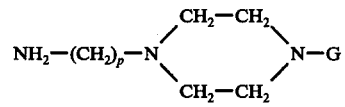

wherein G is independently selected from the group consisting of hydrogen and Ω-aminoalkylene radicals of from 1 to 3 carbon atoms; and p is an integer of from 1 to 4. Nonlimiting examples of such amines include 2-pentadecyl imidazoline; N-(2-aminoethyl) piperazine; N-(3-aminopropyl) piperazine; and N,N'-di-(2-aminoethyl) piperazine.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds having a composition approximating tetraethylene pentamine are available commercially under the trade name "Polyamine H" and Polyamine 400 (PA-400). A similar mixture sold as Polyamine 500 (PA-500) is marketed by Jefferson Chemical Co., New York, N.Y. Similar materials may be made by the polymerization of aziridine, 2-methyl aziridine and azetidine.

Still other amines separated by hetero atom chains such as polyethers or sulfides can be used.

IV. Condensation of Amine Compound With Oxy-Degraded Polymer

When oxy-degradation of the polymer has reached the desired degree, as indicated by oxygen incorporation and/or lowering of the thickening efficiency, the polymer may be preferably transferred to a stirred reactor for further reaction with an amine compound. Alternatively as indicated above, the degraded polymer may preferably first be diluted, or fluxed, with a hydrocarbon or synthetic lubricating oil, to a concentration in the range of about 5 to 50 weight percent in the masticator or mixer for about 5 to 10 minutes, in order to facilitate transfer and reaction with the amine. The oxygen content of the masticated polymer will vary between about 0.05 to 2.0 weight percent, or higher, based on the weight of oxygenated polymer, and depending on the time and temperature used for the oxidative degradation. Usually the oxygen content will be in the range of about 0.15 to 1.0 wt. %.

In contrast to the degradation of the polymer, which is preferably done in the presence of air or oxygen-containing gas, the amination reaction is preferably performed in a reactor which is blanketed with and sparged with nitrogen or other insert gas.

Reaction of the amine compound with the oxy-degraded copolymer takes place readily in a stirred reactor at a temperature in the range of about 12° to 200° C., preferably 135° to 175° C., in an atmosphere from which external air or oxygen is excluded, as by blanketing and sparging with a slow stream of nitrogen. Under these conditions a total reaction time in the range of from about 0.5 to 10 hours is adequate. Where the oxy-degraded polymer has been fluxed with an oil, either in the masticator or in the amination reactor, a solvent extracted, low-pour neutral oil having a viscosity in the range of about 85 to 200 SUS at 100° F. is preferred.

In order to avoid a hazy product, the presence of excess amine will usually be avoided, as otherwise distillation, or vacuum distillation in the case of the higher boiling amines, such as tetraethylenepentamine, will be necessary to remove the unreacted amine. Thus, amination will be carried out with less than a stoichiometric amount of amine. By stoichiometric amount is meant the maximum amount of amine, which will react with the oxygenated polymer, and above which will result in haze in the oil. Thus, the preferred products of the invention will be haze free and will have about 20 to 99%, e.g., 50 to 95%, of the oxygenated groups capable of reacting with the amine, actually so reacted. In this way, the problems of excess amine, with the necessity for further processing steps, are avoided.

The oil-soluble aminated oxy-degraded polymers of this invention can be incorporated in lubricating oil compositions, e.g., automotive or diesel crankcase lubricating oil, in concentrations within the range of about 0.01 to 20 weight percent, e.g., 0.1 to 15.0 weight percent, preferably 0.25 to 10.0 weight percent of the total composition. The lubricants to which the aminated products of this invention can be added include not only hydrocarbon oil derived from petroleum, but also include synthetic lubricants such as: alkyl esters of dibasic acids; complex esters made by esterification of monobasic acids, polyglycols, dibasic acids and alcohols; esters of carbonic and phosphoric acids; carboxylic esters of polyglycols; etc.

The aminated oxy-degraded polymers may be prepared in a concentrate form, e.g., from about 20 weight percent to about 49 weight percent in oil, e.g., mineral lubricating oil, for ease of handling.

The above concentrates may contain other conventional additives, such as dyes, pour point depressants, antiwear agents, antioxidants, other viscosity-index improvers, dispersants and the like.

This invention will be further understood by reference to the following examples which include preferred embodiments of the instant invention.

EXAMPLE 1

A typical laboratory synthesis of a high ethylene content copolymer useful in the invention is as follows:

Ethylene and propylene were continuously polymerized in the presence of n-heptane solvent, with a Ziegler-Natta catalyst consisting of vanadyl chloride ($VOCl_3$) and ethyl aluminum sesquichloride ($Et_3Al_2Cl_3$), while hydrogen was fed continuously to the reactor. The reaction was carried out in a two-liter glass reactor equipped with a stirrer, catalyst and co-catalyst inlet tubes, monomer inlet tubes, solvent inlet tube, product overflow, and a jacket for circulation of chilled water.

Monomers were purified by contact with hot (150° C.) copper oxide and molecular sieves. Solvent was purified and dried by percolation thru molecular sieves and silica gel. Hydrogen was similarly dried by passage through a bed of silica gel. The reaction pressure was maintained at one atmosphere by controlling the rate of monomer addition and product removal. Principal catalyst, ($VOCl_3$) was fed as a 0.03 molar solution in purified n-heptane, while the cocatalyst ($Et_3Al_2Cl_3$) was fed as a 0.15 molar solution in similarly purified heptane. The reaction conditions are shown in Table I under steady state conditions.

TABLE I

| | |
|---|---|
| Volume of Reactor to Overflow | 1500 ml. |
| Heptane feed per minute | 75 ml. |
| Ethylene feed rate, liters per minute | 0.75 |
| Propylene feed rate, liters per minute | 2.25 |
| $VOCl_3$ catalyst solution feed rate, cc. per min. | 1.0 |
| $Et_3Al_2Cl_3$ cocatalyst solution feed, cc. per min. | 1.0 |
| Hydrogen feed rate, cc. per min. at 25° C. | 30.0 |
| Reaction temperature | 55° C. |

A sample of the product was recovered after inactivation of the catalyst with isopropanol, the solvent removed by stripping with steam, catalyst residues extracted from the polymer by slurrying in a Waring Blender with dilute hydrochloric acid, and after thorough water washing, was filtered and dried under vacuum at 50° C. Analysis of the product is shown in Table II.

TABLE II

| | |
|---|---|
| Weight percent ethylene in product[a] | 68.5 |
| Mole percent ethylene in product | 77.0 |
| Inherent viscosity at 135° C. in Decalin, dl./g. | 2.01 |
| Thickening efficiency (T.E.) | 2.7 |
| Wt. % soluble in n-decane at 45° C. | 100.0 |
| Molecular weight distribution $\overline{M}_w/\overline{M}_n$ | 2.2 |
| Crystallinity, weight percent[b] | 11.5 |

[a] determined by the method of Gardner, Cozewith & VerStrate: Rubber Chem. & Tech. 44, 1015 (1971).
[b] determined by the method of VerStrate & Wilchinsky: J. Polymer Sci. A-2, 9, 127 (1971).

EXAMPLE 2

A copolymer of ethylene and propylene, prepared on a commercial scale in essentially the same manner as the copolymer of Example 1, was used in this Example. In brief, the copolymer was synthesized at 55° C. and 65 psig. with a Ziegler-Natta catalyst system comprising $VOCl_3$ and $Et_3Al_2Cl_3$, and a mole ratio of ethylene to propylene of 1:2.5, respectively, in the feed, which also contained hydrogen. The product had an ethylene content of 68 weight percent (76 mole percent); a $\overline{M}_w$ of 245,000; a $\overline{M}_n$ of 81,000, a $\overline{M}_w/\overline{M}_n$ ratio of 3.0, a T.E. of 2.8 and a crystallinity of 7.5 weight percent.

A two and one-half gallon Bramley Beken Blade Mixer, fitted with a 5 H.P. Reeves Vari-Speed MOTO-DRIVE ® geared to provide a speed at the mixer of from about 17 to 85 rpm., was used for the following examples:

(a) Six pounds of the above commercial copolymer, which had been granulated from a slab in a Rietz chopper, was fed to the mixer which was set at a speed of 35 RPM at the input shaft, while at the same time 120 psig. steam was turned on at the jacket. Temperature, measured with a thermocouple, varied between 300° to 365° F. over a period of 5 hours during which time the T.E. of the masticated copolymer decreased from an initial 2.8 to 1.69, while the oxygen content determined by infrared absorption increased.

(b) Six pounds of the above commercial polymer was masticated in the mixer set at an input speed of 66 RPM and 120 psig. steam on the jacket. The temperature varied from 325° to 370° F. while the T.E. of the copolymer during mastication dropped from an initial 2.80 to 1.09.

(c) Six pounds of the above commercial polymer was masticated in the mixer set at an input speed of 85 RPM and 120 psig. steam on the jacket. The T.E. dropped from an initial 2.8 to 0.80 over the course of 5 hours, while the oxygen content of the masticated polymer rose to 0.933 weight percent. Temperature during the 5 hour mastication period varied between 336° to 392° F.

EXAMPLE 3

(a) Six pounds of a commercially available copolymer of ethylene and propylene having an ethylene content of about 68 weight percent (76 mole percent); a $\overline{M}_w$ of 433,000; a $\overline{M}_n$ of 94,000; a $\overline{M}_w/\overline{M}_n$ ratio of 4.6; and an initial T.E. of 4.2 was masticated in the Bramley Beken Mixer at an input shaft speed of 35 RPM. and a steam pressure on the jacket of 120 psig. for 5 hours. During this time the temperature of the masticated, e.g., oxy-degraded polymer varied between 248° and 350° F. At the end of the run the T.E. had been reduced to 1.22.

(b) Six pounds of the same polymer as was used in Example 3(a) was masticated in the same equipment at an input shaft speed of 85 RPM. and a steam pressure of 120 psig. for a period of 5 hours. During that time the temperature varied between 324° and 394° F. The T.E. was reduced at the end of 2 hours from an initial 4.2 to 1.32 with an oxygen uptake of 0.375 weight percent; at the end of 3 hours to a T.E. of 1.10 and oxygen content of 0.590 weight percent and at the end of the run (5 hours) to a T.E. of 0.97 and oxygen content of 0.886 weight percent.

EXAMPLE 4

A 50 gallon Beken Blade Mixer, fitted with a 30 H.P. motor geared to provide input shaft speeds to the mixer of 32, 48 and 72 RPM., and a steam jacket supplied with 75 psig. steam, was used for the following runs. The input shaft speeds noted above refer to the RPM. of the fast rotor, the slow rotor revolving at one-half the RPM. of the fast rotor.

Three runs were made at the above input speeds with a charge to the mixer for each run of 190 pounds of the copolymer of Example 2, i.e., copolymer of ethylene and propylene having an ethylene content of about 68 weight percent (76 mole percent); a T.E. of 2.8 and a crystallinity of 7.5 weight percent, in order to determine the time required to reduce the T.E. of the masticated polymer to a T.E. of 1.4. The results obtained are shown in Table III.

TABLE III

| Mastication Time | 32 RPM | 48 RPM | 72 RPM |
|---|---|---|---|
| 1 Hr. T.E. | 2.7 | 2.5 | 2.4 |
| O$_2$, Wt.% | 0.15 | 0.17 | 01.9 |
| Temp., ° F. | 350 | 370 | 394 |
| 2 Hr. T.E. | 2.2 | 2.1 | 1.5 |
| O$_2$, Wt.% | 0.21 | 0.20 | 0.34 |

TABLE III-continued

| Mastication Time | 32 RPM | 48 RPM | 72 RPM |
|---|---|---|---|
| Temp., ° F. | 373 | 410 | 424 |
| Time(Hrs.)to T.E. of 1.4 | 3.0 | 2.8 | 2.2 |
| O$_2$, Wt.% | 0.32 | 0.35 | 0.36 |
| Temp., ° F. | 402 | 414 | 455 |

At the termination of each of the runs of Examples 2 to 4, a quantity of a solvent extracted paraffinic base neutral, low pour lubricating oil, having a viscosity of about 100 or 150 SUS at 100° F., equal in weight to the weight of copolymer charged to the mixer, was added to the masticated polymer in the mixer. The mixer was then run for about 2 to 5 minutes, with no additional heat input, and then drained to a blending tank. Dilution of the masticated polymer in this manner facilitates drainage from the mixer and subsequent dilution.

EXAMPLE 5

(a) One hundred grams of a 7 weight percent solution of a masticated copolymer of ethylene and propylene in a solvent extracted Midcontinent Base Oil having a viscosity of 105 SUS at 100° F. was reacted with stirring and a gentle sparge of nitrogen with 0.2 gram of a technical grade of tetraethylene pentamine for 4 hours at a temperature of 120° C. The masticated copolymer was that of Table III, and had a T.E. of 1.4 and an oxygen content of 0.36 weight percent and was prepared by oxy-degradation of a copolymer of ethylene and propylene which had an ethylene content of 67 weight percent, a T.E. of 2.8 and a crystallinity of 7.5 weight percent. On cooling, a clear product, free of haze, was obtained which passed the Haze Dilution Test.

This Haze Dilution Test is based on the finding that free amine will precipitate zinc $C_{4-5}$ dialkyl dithiophosphate from an oil solution. This test is carried out by making up a mixture of 10 wt. % of the reaction mixture of the amine and the oxidized polymer in oil, 1.0 wt. % of an oil concentrate containing about 25 wt. % of a light mineral oil and dissolved therein, about 75 wt. % of a zinc dialkyl dithiophosphate prepared by reacting a mixture of about 65 wt. % isobutyl alcohol and about 35 wt. % of mixed primary amyl alcohols with $P_2S_5$ and then neutralizing with zinc oxide, and about 89 wt. % of a white mineral oil. After 4–20 hours heating at 180° F., if there is unreacted, i.e., free, amine present, then a visually observable haze will form due to precipitation of the zinc dialkyl dithiophosphate.

EXAMPLE 6

(a) Eight thousand and forty grams of an oil solution containing 12.7 weight percent of the oxy-degraded copolymer of ethylene and propylene, used in Example 5(a), in the oil of 5(a), were heated with stirring and nitrogen sparge with 22.5 grams of Polyamine 400 (a commercial polyethylene polyamine) in a reaction vessel at 140° C. for three and one-half hours. On cooling, the product was clear and free of haze, passed the Haze Dilution Test noted above, and when compared to PARATONE N ® for thickening efficiency gave a result of 1.38 for the concentrate.

The above aminated oxy-degraded polymer was tested for sonic breakdown. This is a standard measurement for determining the shear stability of polymer-oil compositions, the lower percentage reflecting which compositions have the greatest resistance to shear breakdown and, hence, which are the most stable under automotive lubricating conditions. In this method the sample under test is blended with an approved base stock to a viscosity at 210° F. of 15.0 ± 0.5 centistokes. A portion of the blend is subjected to sonic shearing forces at a specific power input and a constant temperature for 15 minutes. Viscosities are determined on the blend both before and after the treatment; the decrease in viscosity after the treatment is a measure of the molecular breakdown of the polymer under test. It is customary to examine the blend of a standard sample of known behavior each time a test is made, and to use this as a reference to establish the correct value of the sample under test. The corrected value is reported as a percent sonic breakdown which is calculated from the formula:

$$\frac{(\text{Viscosity of blend before test} - \text{Viscosity of blend after test})}{(\text{Viscosity of blend before test} - \text{Viscosity of base oil})} (100)$$

The aminated polymer gave a sonic shear of 4.82%, which is low, indicating good shear stability.

(b) A 10W-30 SAE crankcase oil was made up using 8.0 wt. % of the oil concentrate of 6(a), 3 wt. % of an ashless dispersant additive, 1.2 wt. % of a magnesium containing detergent additive, 1.6 wt. % of a zinc dialkyl dithiophosphate additive, in 86.2 wt. % of a mineral lubricating oil. For comparison purposes, the formulation was made up to the same viscosity without the oil concentrate of 6(a) and instead using a commercial VI-dispersant nitrogen containing acrylate polymer.

The above formulations were tested in the Sequence V-C engine test, which is described in "Multicylinder Test Sequences for Evaluating Automotive Engine Oils," ASTM Special Technical Publication 315F, page 133ff (1973). The V-C test evaluates the ability of an oil to keep sludge in suspension and prevent the deposition of varnish deposits on pistons, valves and other engine parts. The tests results given below clearly show the superior properties of the oil in which the aminated oxy-degraded copolymer of this invention has been incorporated over the competitive product.

| | MS-VC Test Results | | |
|---|---|---|---|
| | Sludge | Piston Skirt Varnish | Total Varnish |
| Oil with aminated copolymer of 6(a) | 8.5 | 8.2 | 8.1 |
| Competitive Oil | 7.7 | 8.1 | 8.0 |
| Passing criteria for test | 8.5 | 8.0 | 8.0 |

In the above test the ratings are on a scale of 0 to 10, with 0 being an excessive amount of sludge and varnish, while 10 being a completely clean engine.

EXAMPLE 7

In a manner similar to that of Example 6(a), aminated products with different amines were made using the 12.7 wt. % solution of the oxy-degraded ethylene-propylene copolymer of Example 5(a). The amination reaction condition products prepared are summarized below:

| Polymer Solution* | Amine | Time, Hr. | Temp., ° F. |
|---|---|---|---|
| 300 gm. | .33 wt.% ethylene diamine | 1.75 | 160 |
| 300 gm. | .27 wt.% N,N-dimethyl propane diamine | 2 | 160 |

| Polymer Solution* | Amine | Time, Hr. | Temp., ° F. |
|---|---|---|---|
| 300 gm. | .17 wt.% diethylene triamine | 2 | 160 |

*Solution in oil of 12.7 wt. % oxidized ethylene-propylene copolymer.

What is claimed is:

1. A composition comprising a major proportion of a lubricating oil and dissolved therein about 0.25 to 10 wt. % of an oil-soluble sludge dispersing, viscosity-index improving product, which is free of haze contributing components comprising:
   the reaction product of a polyethylene amine with an oxygen containing, mechanically degraded copolymer of ethylene and one or more $C_3$ to $C_8$ alpha-olefins, said copolymer prior to degradation being characterized by:
   a. an ethylene content in the range of about 70 to 80 mole percent;
   b. a degree of crystallinity of 3 to 25 weight percent as determined by X-ray and differential scanning calorimetry;
   c. a weight average molecular weight ($\overline{M}_w$) in the range of about 30,000 to 400,000;
   d. a number average molecular weight ($\overline{M}_n$) in the range of about 10,000 to 100,000; and
   e. a range of molecular weights as measured by the ratio of $\overline{M}_w/\overline{M}_n$ of 8 or less;
   said copolymer being degraded by mechanical working in the absence of solvent and in the presence of air at temperatures in the range of about 250° to 750° F., to thereby incorporate into said copolymer about 0.05 to 2.0 wt. % oxygen, based on the weight of the oxygenated copolymer;
   said amine having the general formula:

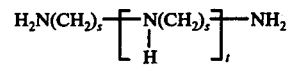

wherein s is 2 and t is 2 to 6;
   and wherein only 50 to 95% of the oxygenated groups of said oxygenated copolymer are reacted with said amine by heating, whereby less than a stoichiometric amount of said amine is reacted and the presence of excess unreacted amine is avoided to thereby form a haze-free product.

2. A composition according to claim 1, wherein said $C_3$ to $C_8$ alpha-olefin is propylene.

3. A composition according to claim 1,
   wherein said copolymer is an ethylene-propylene copolymer of: 70 to 80 mole % ethylene, 4 to 12% crystallinity, and a $\overline{M}_w/\overline{M}_n$ ratio of less than 6;
   wherein the amount of oxygen incorporated into said copolymer is about 0.15 to 1.0 wt. %, based on the weight of the oxygenated copolymer; and
   wherein said oxygenated copolymer and amine are reacted by heating to about 135° to 200° C. while blowing with an inert gas.

4. A composition according to claim 3, wherein said amine is tetraethylene pentamine.

5. A composition according to claim 4, wherein said ethylene-propylene copolymer is about 76 mole % ethylene and has:
   a crystallinity of about 7.5 wt. %, a $\overline{M}_w$ of about 245,000, and a $\overline{M}_n$ of about 81,000.

* * * * *